US 9,578,586 B2

(12) United States Patent
Frydman et al.

(10) Patent No.: US 9,578,586 B2
(45) Date of Patent: Feb. 21, 2017

(54) METHODS CIRCUITS DEVICES SYSTEMS AND ASSOCIATED COMPUTER EXECUTABLE CODE FOR PROVIDING DATA CONNECTIVITY BETWEEN A MOBILE COMMUNICATION DEVICE COMMUNICATIVELY COUPLED TO A MOBILE COMMUNICATION NETWORK AND A THIRD PARTY DATA SOURCE

(71) Applicant: SAGUNA NETWORKS LTD., Yokneam Illit (IL)

(72) Inventors: Daniel Nathan Frydman, Haifa (IL); Lior Fite, Zurit (IL)

(73) Assignee: SAGUNA NETWORKS LTD., Yokneam Illit (IL)

( * ) Notice: Subject to any disclaimer, the term of this patent is extended or adjusted under 35 U.S.C. 154(b) by 548 days.

(21) Appl. No.: 14/045,047

(22) Filed: Oct. 3, 2013

(65) Prior Publication Data
US 2014/0036897 A1   Feb. 6, 2014

Related U.S. Application Data

(63) Continuation-in-part of application No. 13/739,067, filed on Jan. 11, 2013, and a continuation-in-part of (Continued)

(51) Int. Cl.
*H04W 40/00* (2009.01)
*H04L 12/859* (2013.01)
(Continued)

(52) U.S. Cl.
CPC .......... *H04W 40/00* (2013.01); *H04L 61/1511* (2013.01); *H04W 76/022* (2013.01);
(Continued)

(58) Field of Classification Search
CPC .... H04L 45/306; H04L 61/1511; H04L 12/14; H04L 29/06312; H04L 29/12066; H04L 63/30
See application file for complete search history.

(56) References Cited

U.S. PATENT DOCUMENTS 8,855,071 B1 * 10/2014 Sankaran ............ H04W 76/021
370/329
2005/0094651 A1 * 5/2005 Lutz .................... H04M 3/2281
370/401
(Continued)

*Primary Examiner* — Scott M Sciacca
(74) *Attorney, Agent, or Firm* — Vladimir Sherman; Professional Patent Solutions

(57) ABSTRACT

Disclosed are methods, circuits, devices, systems, and associated computer executable code for providing data connectivity between a mobile communication device communicatively coupled to a mobile communication network and a third party data source. There may be provided a Dynamic Application Data Router (DADR) functionally associated with a wireless access point of a mobile communications network. The DADR may include one or more wireless access point interface circuits adapted to interface with circuits of the wireless access point and to facilitate data communication between said DADR and a mobile device communicatively coupled to the wireless Access Point. The DADR may also include an application data routing module adapted to route upstream application data generated by an application running on the mobile device to a target application engine through a DADR associated gateway.

18 Claims, 6 Drawing Sheets

Related U.S. Application Data application No. 13/861,192, filed on Apr. 11, 2013, which is a continuation-in-part of application No. 13/739,067, filed on Jan. 11, 2013.

(60) Provisional application No. 61/723,356, filed on Nov. 7, 2012, provisional application No. 61/585,251, filed on Jan. 11, 2012, provisional application No. 61/723,356, filed on Nov. 7, 2012, provisional application No. 61/622,574, filed on Apr. 11, 2012.

(51) Int. Cl.
    *H04W 92/10*      (2009.01)
    *H04W 76/02*      (2009.01)
    *H04L 29/12*      (2006.01)
    *H04W 40/02*      (2009.01)
    *H04L 12/725*      (2013.01)
    *H04W 88/16*      (2009.01)

(52) U.S. Cl.
CPC .......... *H04W 92/10* (2013.01); *H04L 45/306* (2013.01); *H04W 40/02* (2013.01); *H04W 88/16* (2013.01)

(56) References Cited

U.S. PATENT DOCUMENTS

| | | | |
|---|---|---|---|
| 2008/0037491 A1* | 2/2008 | Shaheen | H04W 4/00 370/338 |
| 2008/0313594 A1* | 12/2008 | Smith | G06F 8/20 717/100 |
| 2009/0016267 A1* | 1/2009 | Otsubo | H04L 45/00 370/328 |
| 2009/0285175 A1* | 11/2009 | Nix | H04L 29/125 370/331 |
| 2011/0013631 A1* | 1/2011 | Frydman | H04L 12/1827 370/390 |
| 2011/0103310 A1* | 5/2011 | Stojanovski | H04L 12/66 370/328 |
| 2011/0131338 A1* | 6/2011 | Hu | H04W 76/02 709/229 |
| 2011/0235595 A1* | 9/2011 | Mehta | H04W 8/082 370/329 |
| 2012/0099429 A1* | 4/2012 | Ludwig | H04L 43/028 370/235 |
| 2012/0170512 A1* | 7/2012 | Gleixner | H04L 61/2514 370/328 |

\* cited by examiner

METHODS CIRCUITS DEVICES SYSTEMS AND ASSOCIATED COMPUTER EXECUTABLE CODE FOR PROVIDING DATA CONNECTIVITY BETWEEN A MOBILE COMMUNICATION DEVICE COMMUNICATIVELY COUPLED TO A MOBILE COMMUNICATION NETWORK AND A THIRD PARTY DATA SOURCE

CROSS REFERENCE

The present application claims the priority of U.S. Provisional Patent Application 61/723,356, filed Nov. 7, 2012, the disclosures of which are incorporated herein by reference in their entirety.

The present application is also a Continuation in Part of U.S. patent application Ser. No. 13/739,067, filed Jan. 11, 2013 and titled "METHODS, CIRCUITS, DEVICES, SYSTEMS AND ASSOCIATED COMPUTER EXECUTABLE CODE FOR PROVIDING DOMAIN NAME RESOLUTION", which claims the benefit of U.S. Provisional Patent Application 61/585,251, filed Jan. 11, 2012, the disclosures of which are both incorporated herein by reference in their entirety.

The present application is also a Continuation in Part of U.S. patent application Ser. No. 13/861,192, filed Apr. 11, 2013 and titled "METHODS, CIRCUITS, DEVICES, SYSTEMS AND ASSOCIATED COMPUTER EXECUTABLE CODE FOR FACILITATING ACCESS TO A CONTENT SOURCE THROUGH A WIRELESS MOBILE NETWORK", which claims the benefit of U.S. Provisional Patent Application 61/622,574, filed Apr. 11, 2012 and U.S. Provisional Patent Application 61/723,356, filed Nov. 7, 2012, U.S. patent application Ser. No. 13/861,192 is also a Continuation in Part of U.S. patent application Ser. No. 13/739,067, filed Jan. 11, 2013 and the disclosures of which are all incorporated herein by reference in their entirety.

FIELD OF THE INVENTION

Some embodiments relate generally to the field of domain name systems, and more particularly, to methods, circuits, devices, systems and associated computer executable code for providing data connectivity between a mobile data client device communicatively coupled to an access zone of a wireless data and/or cellular mobile network and an application engine, such as an application server connected to the public internet.

BACKGROUND

Remote on-demand access to computer and communication network resources, including Internet access, is widespread. With the Internet becoming increasingly popular, more network users are able to connect to a remote server through any device with an internet connection. Users are able to connect to the Internet from home computers, laptops, tablets, smart phones, e-book readers, and any other mobile Internet device. When connected to the internet, users often download or stream significant amounts of data from various data sources, such as websites, media servers and Application Servers, hosted on servers connected to the internet or any other type of network such as Content Delivery Networks (CDN's).

Data servers, Media Servers and Application Engines connected to a data network, such as the Internet, at one or more network nodes, are typically identifiable and addressable using an Internet Protocol (e.g. IP v4 and v6) address. Websites and other data sources connected to the Internet are, however, typically associated with a server name or domain name. The Domain Name System (DNS) is a hierarchical distributed naming system for computers, services or any resource connected to the Internet or a private network. It associates various information with domain names assigned to each of the participating entities. A Domain Name Service resolves queries for these names into IP addresses for the purpose of locating computer services and devices either on a local network or worldwide on the Internet. By providing a worldwide, distributed keyword-based redirection service, the Domain Name System is an essential component of the functionality of the Internet.

An often-used analogy to explain the Domain Name System is that it serves as the phone book for the Internet by translating human-friendly computer hostnames into IP addresses. For example, the domain name www.example.com translates to the addresses 192.0.43.10 (IPv4) and 2620:0:2d0:200::10 (IPv6). Unlike a phone book, DNS can be quickly updated and these updates are distributed, allowing a service's location on the network to change without affecting the end users, who continue to use the same hostname. Users take advantage of this when they recite meaningful Uniform Resource Locators (URLs) and e-mail addresses without having to know how the computer actually locates the services.

The Domain Name System distributes the responsibility of assigning domain names and mapping those names to IP addresses by designating authoritative name servers for each domain. Authoritative name servers are assigned to be responsible for their particular domains, and in turn can assign other authoritative name servers for their sub-domains. This mechanism has made the DNS distributed and fault tolerant and has helped avoid the need for a single central register to be continuously consulted and updated. Additionally, the responsibility for maintaining and updating the master record for the domains is spread among many domain name registrars, who compete for the end-user's, i.e. domain-owner's, business. Domains can be moved from registrar to registrar at any time.

The Domain Name System also specifies the technical functionality of this database service. It defines the DNS protocol, a detailed specification of the data structures and communication exchanges used in DNS, as part of the Internet Protocol Suite.

The Internet maintains two principal namespaces, the domain name hierarchy and the Internet Protocol (IP) address spaces. The Domain Name System maintains the domain name hierarchy and provides translation services between it and the address spaces. Internet name servers and a communication protocol implement the Domain Name System. A DNS name server is a server that stores the DNS records for a domain name, such as address (A) records, name server (NS) records, and mail exchanger (MX) records (see also list of DNS record types); a DNS name server responds with answers to queries against its database.

The growing demand for packet data (e.g. TCP/IP) services over mobile networks, including: (1) mixed and rich content websites, and (2) video and audio content streaming, has fostered enormous bandwidth and data traffic requirements for mobile communication/access networks. A single webpage may include URL's to multiple content sources, static and dynamic, and the loading of a single webpage may typically require between 15 and 20 DNS transactions with a remote DNS server. During peak network traffic hours, these requests may take between 3 and 4 seconds, thereby leading to a long delay in start of service and consequently, to customer frustration.

Additionally, in 2009 the volume of data traffic over mobile network exceeded that of voice traffic, mobile data has more or less tripled each year in volume thus taking over more and more of the mobile traffic in volume. On the profitability side, mobile data opens new revenue possibilities to the MNOs. A major obstacle standing before the MNOs, however, is their inability to connect to the content thus suffering from the Over-The-Top (OTT) syndrome. In addition, many of the applications generate data that imposes inflexible requirements on the way traffic should be served over the network. In order to enable adequate user experience, the data must be supplied to the UE according to strict bit-rate requirements. Any deviations from these requirements automatically lead to lousy experiences and eventually, to the abandonment of the service by consumers.

An additional important factor is the protocol used to pass data over the network—TCP. Wireless networks are characterized by high losses due to radio propagation impairments, high delays, and limited bandwidth. Small scale degradations over the air interface, such as fast fading, induce fluctuations and losses over the air interface are mistakenly taken as congestion over the fixed networks by TCP. Although radio link control mechanisms typically use retransmissions to achieve error free communications over the air interface, these radio retransmissions cause delays that are large compared to TCP timescales, resulting in degradation of end-to-end throughput through the network. A major issue is that TCP misinterprets errors over wireless links as congestions and reacts by retransmitting TCP segments and by reducing the congestion window and thus the overall application throughput. The main factors driving the TCP performance are the TCP roundtrip delay and Packet loss. Reducing the RTT and packet loss can dramatically improve the TCP behavior and thus the way data is passing over the network.

SUMMARY OF THE INVENTION

The present invention includes methods, circuits, devices, apparatuses, systems and associated computer executable code for providing data connectivity between an application running on a mobile communication device, which device is communicatively coupled to an access zone of a wireless data network and/or to a cellular mobile network (hereafter "Wireless Mobile Network" or "Mobile Network"), and an application server and/or application engine (hereinafter "Application Engine") corresponding to the application running on the mobile device (hereinafter "Mobile Device Application"). The present invention is also applicable for providing connectivity to any type of generic application, for example to a Web Browser which may download an application, such as a Java Script or other, to be run locally.

The Application Engine may be integral or otherwise functionally associated with the Mobile Network. Alternatively, the Application Engine may be remote from the Mobile Network and may be accessed either through the public Internet or through a content delivery/distribution network (CDN) accessible to the Mobile Network. According to further embodiments, data sent from the Application Engine to the Mobile Device Application may be received at the Mobile Network through a network gateway associated with the access zone of the mobile communication device and may be forwarded to both the mobile communication device on which the Mobile Device Application is running and to a core of the Wireless Mobile Network (hereinafter "Network Core" or "NC"). Data/Acks generated by the Mobile Device Application may be sent to the corresponding Application Engine through the access zone associated gateway, while a copy of the Mobile Device Application generated Data/Acks may also be forwarded to the Network Core. As charging and Lawful Inspection ("LI") with bit exact requirements must be supported in these networks, according to some embodiments, all traffic may be passed through the core of the network where it can be counted for charging and recorded when required for LI. According to some embodiments, a wireless network may include multiple network cores, and accordingly, a DADR may engage in a discovery process (e.g. SGi discovery process) to determine with which core it is to be functionally associated and communicate.

According to embodiments, there may be provided a Dynamic Application Data Router (DADR) functionally associated with an access zone of a Mobile Network, which DADR may be adapted to facilitate data connectivity between a mobile communication device (Mobile Device) wirelessly connected to a given Network Access Zone (NAZ) of the Mobile Network, and an Application Engine. The Mobile Network may include a Network Core (NC) and one or more NAZ's, some or all of which NAZ's may be functionally associated with one or more separate DADR's. A NAZ according to embodiments may include either: (1) a single wireless access point, (2) a base-station and/or cell site (hereinafter "Access Point"), and/or may include (3) any combination of access points, base-stations and/or cell sites in geographic or communicational proximity with one another (hereinafter "Access Points").

According to embodiments, a mobile communications network may include a network core, one or more wireless access points communicatively coupled to the network core and adapted to wirelessly communicate with one or more mobile devices and a dynamic application data router (DADR) functionally associated with at least one of the wireless access points. The DADR may include one or more wireless access point interface circuits adapted to interface with circuits of the at least one wireless access points and to facilitate data communication between said DADR and a mobile device communicating with the wireless access point. The DADR may also include an application data routing module adapted to route upstream application data generated by an application running on the mobile device to a target application engine through a DADR associated gateway. The application data routing module may be further adapted to route a copy of the upstream application data to the network core through a mobile network core tunnel, gateway or endpoint. The DADR associated gateway may be adapted to forward the upstream application data to the target application engine. The DADR associated gateway may be further adapted to receive the downstream application data from the target application engine.

The application data routing module may be further adapted to route downstream application data received from the target application engine, though the DADR associated gateway, to the mobile device through the one or more wireless access point interface circuits. The application data routing module may be further adapted to route a copy of the downstream application data to the network core through a mobile network core tunnel, gateway or endpoint.

According to embodiments, the DADR may include a zone specific DNS to store network addresses of one or more application engines accessible through said DADR associated gateway. The routing module may be adapted to route the upstream data only to the network core when a network address for a target application engine is not present in the zone specific DNS. The routing module may be adapted to route downstream data received through the network core when a network address for a target application engine was not present in said zone specific DNS.

Upstream and downstream application related data received at the core may be routed by a media router functionally associated with an internet gateway of the network core. The media router may receive the upstream and/or the downstream application related data, which was forwarded to the core by the DADR, either through the network core associated internet gateway or through an alternate data route bypassing the Internet gateway. The media router, upon identifying the upstream and/or the downstream application related data as having been forwarded to the core by the DADR, may route the upstream and/or the downstream application related data back towards a receiving port on the Internet side of the network core Internet gateway. Once received at the core of the network, the upstream and/or the downstream application related data may be inspected and/or processed for LI and billing purposes. According to embodiment, the mobile communication network may include one or more traffic filters, for example a downstream/downlink traffic filter, positioned between the network core and the DADR. This filter may selectively block downstream tracking routed to the core by the media router from being transmitted to the relevant access point and mobile device.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
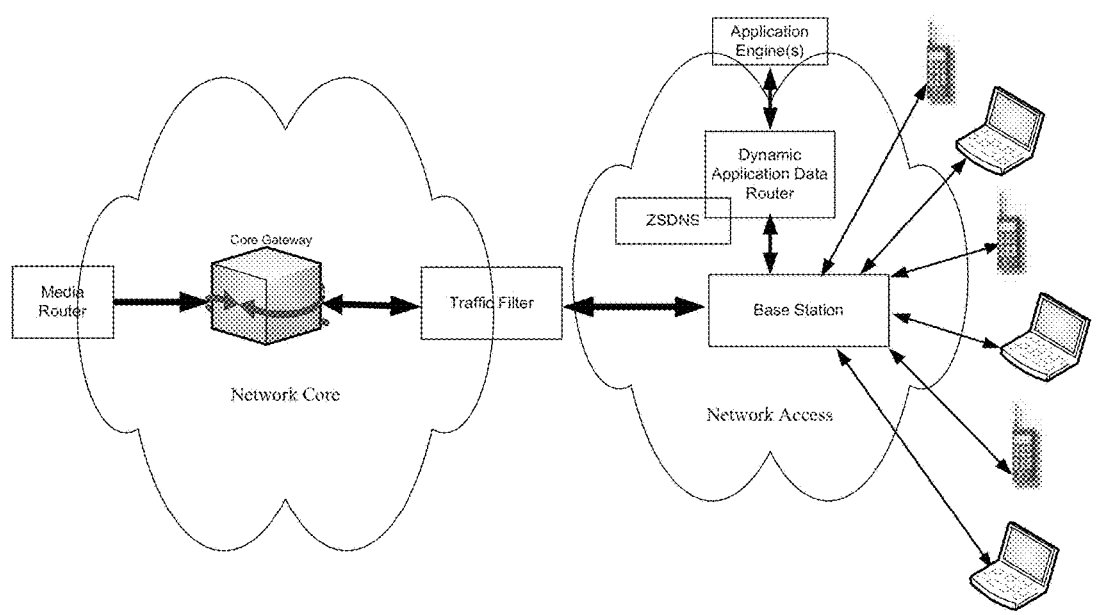
FIG. 1 is a conceptual network diagram of an exemplary mobile communication network including a Dynamic Application Data Router according to embodiments.
Figure 2:
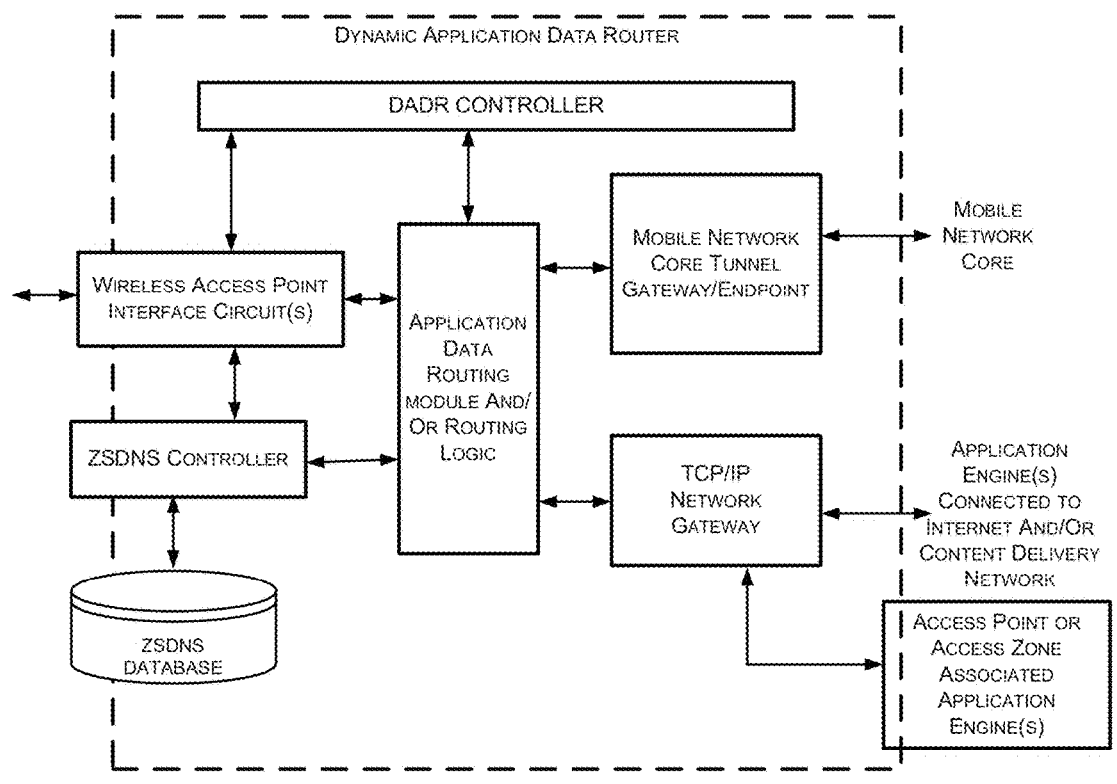
FIG. 2 is a functional block diagram of an exemplary Dynamic Application Data Router according to embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

It should be understood that some embodiments may be used in a variety of applications. Although embodiments of the invention are not limited in this respect, one or more of the methods, devices and/or systems disclosed herein may be used in many applications, e.g., civil applications, military applications, medical applications, commercial applications, or any other suitable application.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can comprise, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk—read only memory (CD-ROM), compact disk—read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other functionally suitable components may be used.

The present invention includes methods, circuits, devices, apparatuses, systems and associated computer executable code for providing data connectivity between an application running on a mobile communication device, which device is communicatively coupled to an access zone of a wireless data network and/or to a cellular mobile network (hereafter "Wireless Mobile Network" or "Mobile Network"), and an application server and/or application engine (hereinafter "Application Engine") corresponding to the application running on the mobile device (hereinafter "Mobile Device Application"). The present invention is also applicable for providing connectivity to any type of generic application, for example to a Web Browser which may download an application, such as a Java Script or other, to be run locally.

The Application Engine may be integral or otherwise functionally associated with the Mobile Network. Alternatively, the Application Engine may be remote from the Mobile Network and may be accessed either through the public Internet or through a content delivery/distribution network (CDN) accessible to the Mobile Network. According to further embodiments, data sent from the Application Engine to the Mobile Device Application may be received at the Mobile Network through a network gateway associated with the access zone of the mobile communication device and may be forwarded to both the mobile communication device on which the Mobile Device Application is running and to the core of Wireless Mobile Network (hereinafter "Network Core" or "NC"). Data/Acks generated by the Mobile Device Application may be sent to the corresponding Application Engine through the access zone associated gateway, while a copy of the Mobile Device Application generated Data/Acks may also be forwarded to the Network Core.

According to embodiments, there may be provided a Dynamic Application Data Router (DADR) functionally associated with an access zone of a Mobile Network, which DADR may be adapted to facilitate data connectivity between a mobile communication device (Mobile Device) wirelessly connected to a given Network Access Zone (NAZ) of the Mobile Network, and an Application Engine. The Mobile Network may include a Network Core (NC) and one or more NAZ's, some or all of which NAZ's may be functionally associated with one or more separate DADR's. A NAZ according to embodiments may include either: (1) a single wireless access point, (2) a base-station and/or cell site (hereinafter "Access Point"), and/or may include (3) any combination of access points, base-stations and/or cell sites in geographic or communicational proximity with one another (hereinafter "Access Points").

A DADR according to embodiments may be communicatively coupled to one or more Access Points associated with one or more NAZ's and may perform any combination of the following functions: (1) zone specific Domain Name System (DNS) functions, (2) inbound and outbound application data stream replication, (3) physical port routing, (4) Internet or external network gateway functions, (5) Network Address Translation (NAT), and (5) data tunnel endpoint functions. The DADR may include or be functionally associated with interface circuits and/or interface applications providing data connectivity with one or more Mobile Network Access Points. The interface to the Access Points may either be direct or may be through other access network hardware. The DARD may also include or be functionally associated with: (1) a zone specific DNS, (2) an application data routing module and/or application data routing logic adapted to route and/or replicate application related data originating from the Application Engine and/or originating from the Mobile Device Application, (3) a TCP/IP, UDP or other network gateway adapted to communicate with an Application Engine, (4) a mobile network core tunnel endpoint and/or network core tunnel gateway adapted to communicate with the Mobile Network NC, and (5) a controller or control logic adapted to coordinate the activities of some or all of the other DADR constituents.

A given DADR may include or be functionally associated with a DNS server, database and/or cache (hereinafter "DNS"), which DNS may provide domain name resolution services to an application running on a mobile device requesting DNS service through any of the one or more access points associated with the given DADR. A DNS associated with a given DADR may be referred to as a Zone Specific Domain Name System (ZSDNS). Exemplary structures and functionalities of a ZSDNS are described in co-pending U.S. patent application Ser. No. 13/739,067 the teachings of which are hereby incorporated by reference in their entirety. According to embodiments, the ZSDNS may include records associated with one or more Application Engines accessible through the given DADR's TCP/IP or other protocol gateway and the records may include data routing information (e.g. IP Addresses, Port Numbers, etc.) for accessing the one or more Application Engines through the TCP/IP gateway. Accordingly, the ZSDNS may respond to a DNS query by an application running on a Mobile Device connected to an Access Point of the DADR of the ZSDNS with data routing information indicating a data route through the given DADR TCP/IP gateway. Additionally, a ZSDNS response to a DNS query relating to an Application Engine accessible through the DADR TCP/IP gateway may include a flag or a code embedded within the data routing information, such that when the application transmits data or a data request to the Application Engine, the DADR may detect the flag or code in the routing information of the data/request and accordingly may forward the data/request through the DADR's associated TCP/IP gateway.

A given DADR may include or be functionally associated with an application data routing module, and/or application data routing logic, adapted to route and optionally to replicate application related data originating from the Application Engine and/or originating from the Mobile Device Application. According to embodiments, application related data and/or application related data requests generated by the Mobile Device Application and addressed to a corresponding Application Engine (hereinafter "Upstream Application Data") may be received at the DADR interface and forwarded to the routing module/logic. Upon determining that the target Application Engine may be contacted through the DADR's associated TCP/IP gateway, the routing module/logic may forward the Upstream Application Data to the Application Engine through the associated TCP/IP gateway. Likewise, application related data generated by the Application Engine and addressed to the Mobile Device Application (Downstream Application Data) may be received at the DADR's TCP/IP or other protocol gateway and the routing module/logic may forward the Downstream Application Data to the Mobile Device and Mobile Application running thereon through a client device data stream interface.

According to some embodiments, the routing module/logic of a given DADR may be adapted to detect flags or codes embedded within an Upstream Application Data indicating accessibility of the Upstream Application Data's destination/target (i.e. Application Engine) through the given DADR's TCP/IP or other protocol gateway. According to further embodiments, the routing module/logic of a given DADR may be adapted to reference the DADR's associated ZSDNS using the Upstream Application Data's target/destination parameter(s) (e.g. Domain Name, URL, IP Address, etc.) in order to assess or determine whether the Upstream Application Data's target/destination is accessible through the given DADR's TCP/IP gateway. Regardless of the method by which the routing module/logic determines that the target of the Upstream Application Data is accessible through the given DADR's TCP/IP gateway, such an assessment may trigger routing of the Upstream Application Data to the target through the given DADR's TCP/IP gateway. Likewise, Downstream Application Data from the target (Application Engine), responsive to the Upstream Application Data, may be received at the Mobile Network through the given DADR's TCP/IP gateway and forwarded by the DADR routing module/logic to the Mobile Device and thus the Mobile Application.

According to yet further embodiments, the routing module/logic may also forward a copy of both Upstream Application Data (TCP/IP) packets and Downstream Application Data packets (TCP/IP) to the Mobile Network's NC through mobile network core tunnel endpoints and/or gateways (DADR Tunnel Gateway) integral or otherwise functionally associated with the DADR. The DADR Tunnel Gateway may be connected to an uplink line or channel of the Mobile Network, which uplink line or channel may lead to another tunnel endpoint/gateway (NC Tunnel Gateway) at or near the NC and in communicative proximity with a (TCP/IP) gateway integral or otherwise functionally associated with the NC (NC TCP/IP Gateway). The DADR Tunnel Gateway may encapsulate Upstream and Downstream Application Data packets into a Mobile Network uplink tunnel data stream while the NC Tunnel Gateway may de-encapsulate the packets and forward the packets to a port (e.g. External Network/Internet Port) of the NC TCP/IP Gateway. A copy of the TCP Acks received by the DADR from the Mobile Device Application and destined to the specific Application Engine may be forwarded over the uplink mobile tunnel (GTP-U or other) that exists for this UE towards the specific NC for charging and lawful interception purposes.

Upstream and Downstream Application Data packets received by the NC TCP/IP or other protocol Gateway from a NC Tunnel Gateway, and the data contained therein, may be metered, monitored, inspected and/or recorded (hereinafter NC Processes) by one or more network appliances at or near the network core. These NC processes may be performed for billing purposes and/or for Legal Inspection compliance purposes.

According to embodiments, there may be provided one or more data traffic filters located on a downlink data path from the NC TCP/IP Gateway. The traffic filters may be communicatively coupled to one or more DADR controllers or DADR control logics and may be instructed which Downstream Application Data packets to block or pass. Alternatively, the traffic filter may include inspection logic and may autonomously determine which packets to pass or block. Transmission of the Downstream Application Data packets to the Access point may or may not be blocked (e.g. by a traffic filter) depending upon whether the target Mobile Device is still communicatively coupled to the Mobile Network through the same Access Point with which the Mobile Device initiated a communication session with the Application Engine which generated the Downstream Application Data. In the event the Mobile device is connected to the same Access Point, transmission of the Downstream Application Data back to the same Access Point may be blocked by a traffic filter located downstream from the NC TCP/IP or other protocol gateway. Alternatively, if the Mobile Device has been handed-off to a new Access Point, the Downstream Application Data may be forwarded through a downlink tunnel of the Mobile Network to the new Access Point for delivery to the Mobile Device/Application, if the specific application being served to the Mobile Device is one that requires continuity.

Upstream and downstream application related data received at the core may be routed by a media router functionally associated with an Internet gateway of the network core. The media router may receive the upstream and/or the downstream application related data, which was forwarded to the core by the DADR, either through the network core associated Internet gateway or through an alternate data route bypassing the Internet gateway. The media router, upon identifying the upstream and/or the downstream application related data as having been forwarded to the core by the DADR, may route the upstream and/or the downstream application related data back towards a receiving port on the Internet side of the network core Internet gateway. Once received at the core of the network, the upstream and/or the downstream application related data may be inspected and/or processed for LI and billing purposes. According to embodiment, the mobile communication network may include one or more traffic filters, for example a downstream/downlink traffic filter, positioned between the network core and the DADR. This filter may selectively block downstream tracking routed to the core by the media router from being transmitted to the relevant access point and mobile device.

Turning now to FIG. 1, there is shown a conceptual network diagram of an exemplary mobile communication network including a Dynamic Application Data Router (DADR) according to embodiments. The DADR is functionally associated with a base station of network access portion or zone of the mobile communication network and, under certain conditions, bridges connectivity between applications running one or more mobile devices communicatively coupled to the base station and one or more third party data sources, such as one or more application servers/engines. Under conditions when a zone specific DNS, associated with the DADR, does not have sufficient information to handle a specific data request from a specific mobile device application, the DADR may refrain from bridging connectivity between the specific application and the third party data source. Irrespective of whether DADR bridges connectivity for a given mobile application, both upstream and downstream (can also be referred to as uplink and downlink) data between the mobile device application and an application engine may be transmitted to the network, for purposes such as billing and/or lawful inspection.

A traffic filter associated with the DADR may selectively intercept application engine related data which was sent to, or is returning from, the network core. Exemplary data flow facilitated by an exemplary DADR and associated traffic filter is shown in FIG. 4, which figure shows a packet/data flow diagram illustrating information flow between a mobile application and an application server/engine. FIG. 4 indicates packet generation, manipulation and blocking which may be performed at various network nodes or elements of a mobile communications network according to embodiments. FIG. 4 illustrates application data traffic flow through the mobile network during several separate scenarios: (1) SGi discovery, (2) Establishing Tunnel, (3) DADR usage prior to AP base-station handoff of a mobile device running an application which is engaged in a communication session with an application engine through the DADR, and (4) DADR usage after base-station handoff of a mobile device running an application which is engaged in a communication session with an application engine through the DADR. The exemplary data/packet flow shown in FIG. 4, which may be reviewed in the context of the network diagrams of FIGS. 1, 2, 3, 5A and 5B, includes the following stages and steps:

SGi Discovery

To enable re-routing of the 3P app downstream packets through the EPC, a DADR needs to identify the specific SGi it should route the traffic to. Upon a new connection (Or newly identified UE-Tunnel (new upstream packet from a new RAB/GTP tunnel)) Or, if an existing tunnel does not have the identification of the SGi, a SGi identification process may be initiated: An optional such process may be:
DADR sends an empty tunneled TCP packet (in GTP)
With its IP address inside TCP options
Source: UE, Destination: x.x.x.x
Media router listens on destination IP address x.x.x.x
On Receive x.x.x.x.
1. Updates the tunnel with the DADR IP address
2. Send back an empty tunneled TCP packets with its IP address within TCP options
Source: x.x.x.x, Destination: UE
DADR listens on source IP address x.x.x.x.
On Receive x.x.x.x., DADR updates the tunnel with the AR IP address
A retry of this process may be issued upon failure or timeout,
DNS Server (DNSS)—Compliance with LI
Upstream
On each "local" DNS Query (Local DNS query is a DNS query for which the DNS server has a local response, as opposed to a changed response)
1. DADR::DNSS may mark the DNS query for Application Router (AR) removal (tunneled UDP)
2. DADR may mark DNS query for MR removal "101" using the "reserved" 3 bit in the DNS query header
3. AR may remove the packet
Downstream
For each "local" DNS Response
1. DNSS may send Response to UE (tunneled UDP)
2. DNSS may resend Response to AR (optionally via UDP in IP)
3. AR may send DNS Response (tunneled UDP) marked for Termination point (TP) removal "010"
4. TP may remove the packet
DADR Routine—without Handover
Upstream
1. UE may send a packet to 3P app
2. DADR may route 3P packet coming from UE to 3P app (according to destination IP) (GTP to TCP/IP)
3. DADR may mark the tunneled packet for TP removal (for example by using the TCP Urgent Pointer) and send it upstream towards the EPC
4. The packets reach the AR, are may be sent back via the EPC and removed by the TP.
Downstream
1. 3P app may send a packet to UE
2. DADR may route packet to the UE (TCP to GTP)
3. DADR may re-route packet to AR via IP in IP protocol or via any other tunnel mechanism
4. AR may send packet towards the EPC
5. These Packet after passing through the EPC may pass to the DADR or may be blocked by a traffic filter.
6. DADR, on receiving packet, may check the rate of the downstream packets coming from the EPC and may keep the downstream to UE within the EPC policy using a buffering
DADR Routine—with Handover Such that UE Moves to a Different AP/eNB
Upstream
1. UE may send next packet (typically TCP_Ack) Or, UE session is timed-out and UE resends last packet (typically TCP_Ack)
2. AR may receive the packet (typically TCP_Ack) without the mark from DADR—identifies handover
3. AR may send the packet to the original DADR via IP in IP or any other protocol
4. DADR may identify handover
5. DADR may route the packet to 3P App
Downstream
1. 3P App may send packet to UE
2. DADR may route the packet to AR via CODP via IP in IP or any other protocol
3. AR may route the packet towards the EPC Turning now to FIG. 2, there is shown a functional block diagram of an exemplary Dynamic Application Data Router according to embodiments. The DADR's placement and functionality within the mobile network may be explained in conjunction with FIG. 3, which shows a network level diagram of an exemplary mobile (cellular) communications network according to embodiments and having: (1) multiple Network Access Zones, where each Network Zone includes multiple access points (base stations) through which data clients may access internet resources, and (2) Dynamic Application Data Router functionally linked to access points of Access Zone 2. The DADR may receive data from and transmit data to mobile devices communicatively coupled to a base station or access point of the mobile network through wireless access point interface circuit(s). An integral or otherwise functionally associated zone specific DNS (ZS-DNS) controller and ZSDNS database may store and provide routing information for mobile device application requests to one or more application servers or engines. The application data routing module or logic may route such data requests through the DADR associated TCP/IP network gateway when routing information (e.g. IP address) is available in the ZSDNS. The routing module or logic may also route response data from an application server or engine, received through the associated TCP/IP network gateway, back to the requesting application, through the wireless access point interface circuits. The routing module or logic may also facilitate a copy of the data request being sent to the server/engine and the data response received from the server/engine, through the TCP/IP network gateway, to be forwarded to the network core through the mobile network core tunnel gateway or endpoint. A DADR controller may coordinate the activity of some or all of the DADR constituent components. Additionally, the DADR may communicate with a functionally associated traffic filter and indicate to the filter which downlink or downstream traffic to block.

Figure 3:
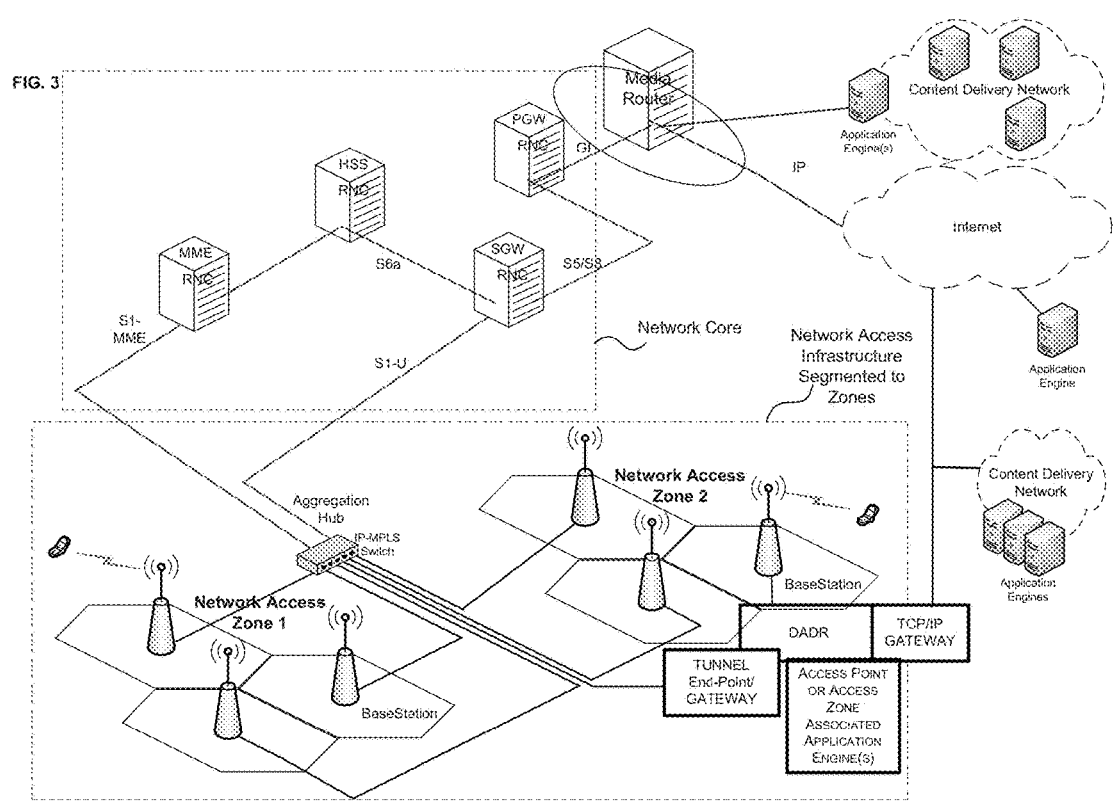
FIG. 3 is a network level diagram of an exemplary mobile (cellular) communications network according to embodiments and having: (1) multiple Network Access Zones, wherein each Network Zone includes multiple access points (base stations) through which data clients may access Internet resources, and (2) a Dynamic Application Data Router functionally linked to access points of Access Zone 2.
Figure 4:
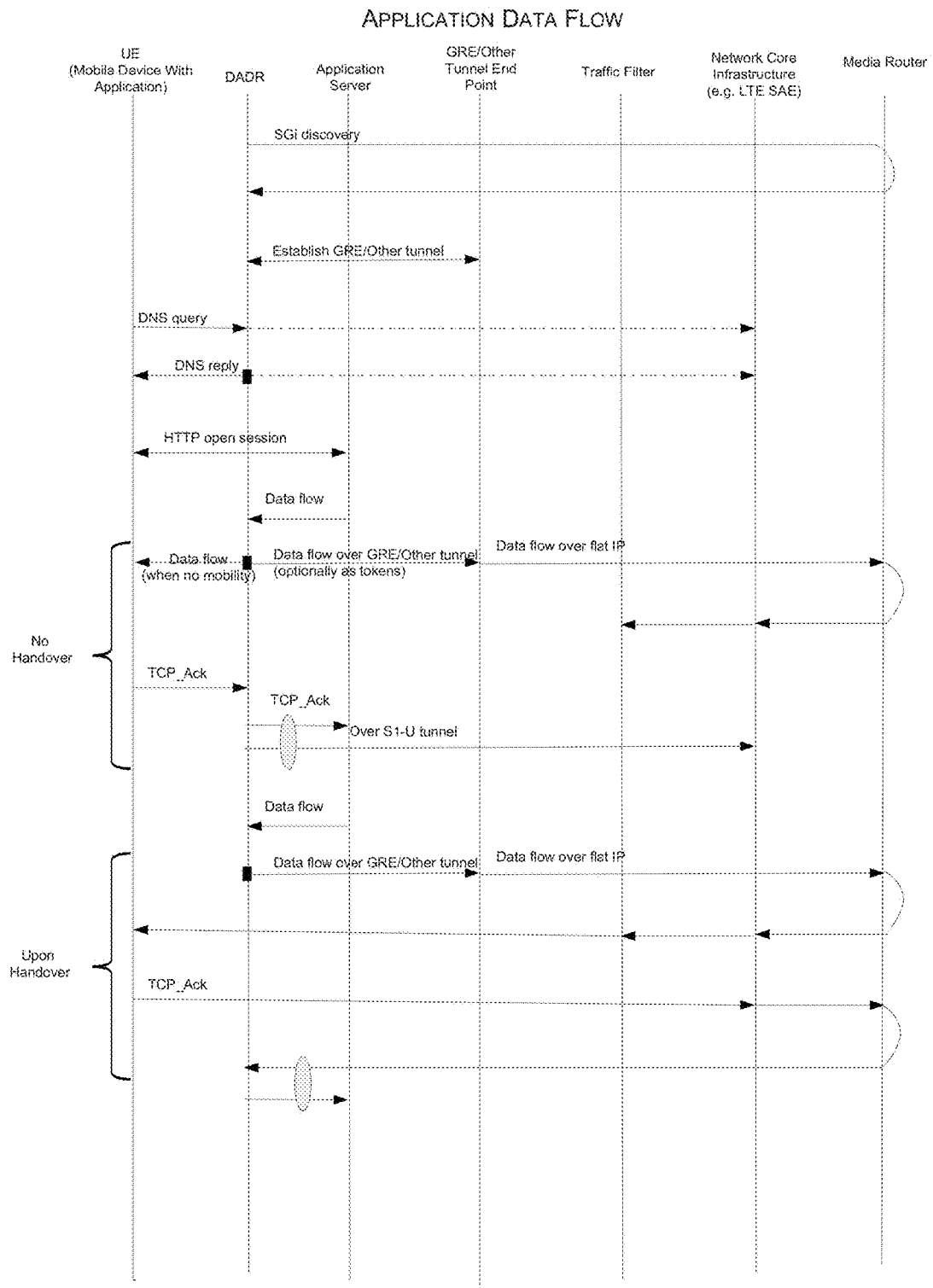
FIG. 4 is packet diagram illustrating packet flow between a mobile application and an application server, through various network elements of a mobile communications network, according to embodiments, before and prior to a base-station handoff scenario.

As evident from FIG. 3, the application engine(s) accessible to through the TCP/IP network gateway, also referred to as the DADR associated gateway, may be connected to the Internet, either alone or as part of a content delivery network, or may be implemented within the base-station or access zone infrastructure to which the DADR is connected.

Figure 5A:
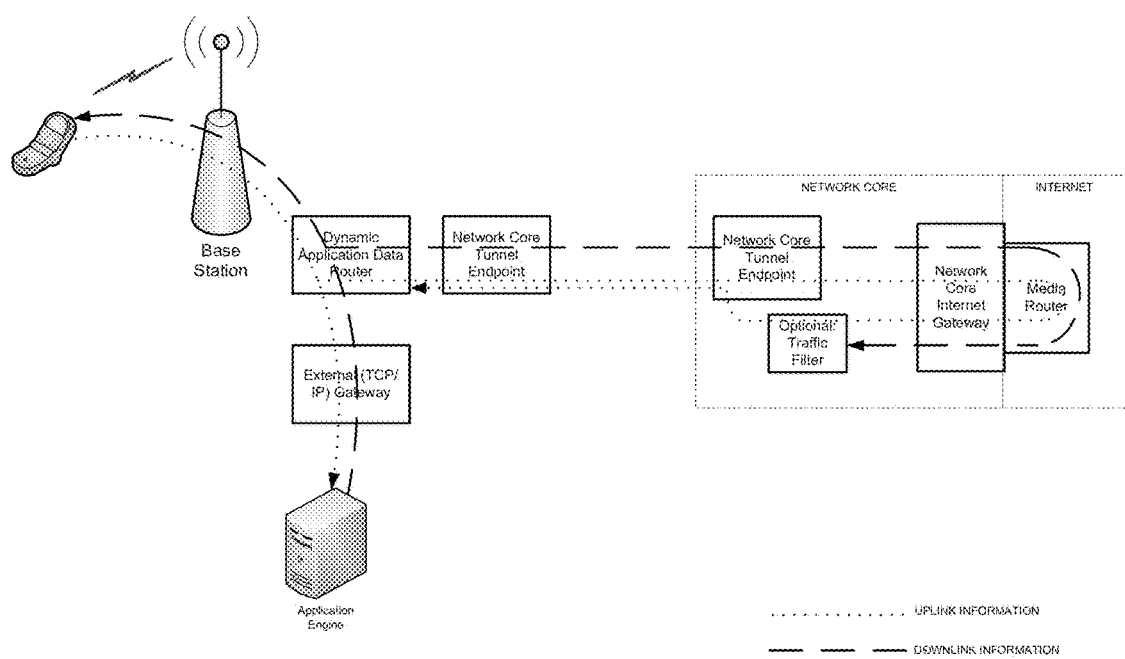
FIG. 5A is a functional block and information flow diagram indicating both upstream and downstream information flow between a mobile application and an application engine through a mobile communication network according to embodiments, all prior to a base-station handoff scenario.

FIG. 5A is a functional block and information flow diagram indicating both upstream/uplink and downstream/downlink information flow, between a mobile application and an application engine, through a mobile communication network according to embodiments, all prior to a base-station handoff scenario. This scenario indicates that uplink data from an application running on a mobile device is sent directly to the application engine through the TCP/IP network gateway associated with the DADR of the base-station to which the mobile device is communicatively coupled. A copy of the uplink data and a copy of the downlink data from the application engine is sent to the core through a mobile network tunnel endpoint/gateway. Upon reaching the core, the data is sent for re-routing to a functionally associated media router, which media routed is functionally associated with an Internet gateway of the network core. The media router may receive the upstream and/or the downstream application related data, which was forwarded to the core by the DADR, either through the network core associated Internet gateway or through an alternate data route bypassing the Internet gateway. The media router routes the upstream and/or the downstream application related data back towards a receiving port on the Internet side of the network core Internet gateway. Once the data is received again (as if arriving from the Internet) at the core of the network, the upstream and/or the downstream application related data may be inspected and/or processed for LI and billing purposes. According to embodiment, the mobile communication network includes one or more traffic filters, for example a downstream/downlink traffic filter, positioned between the network core and the DADR. This filter is intended to selectively block downstream traffic routed to the core by the media router from being transmitted further downstream to the relevant access point and the mobile device.

Figure 5B:
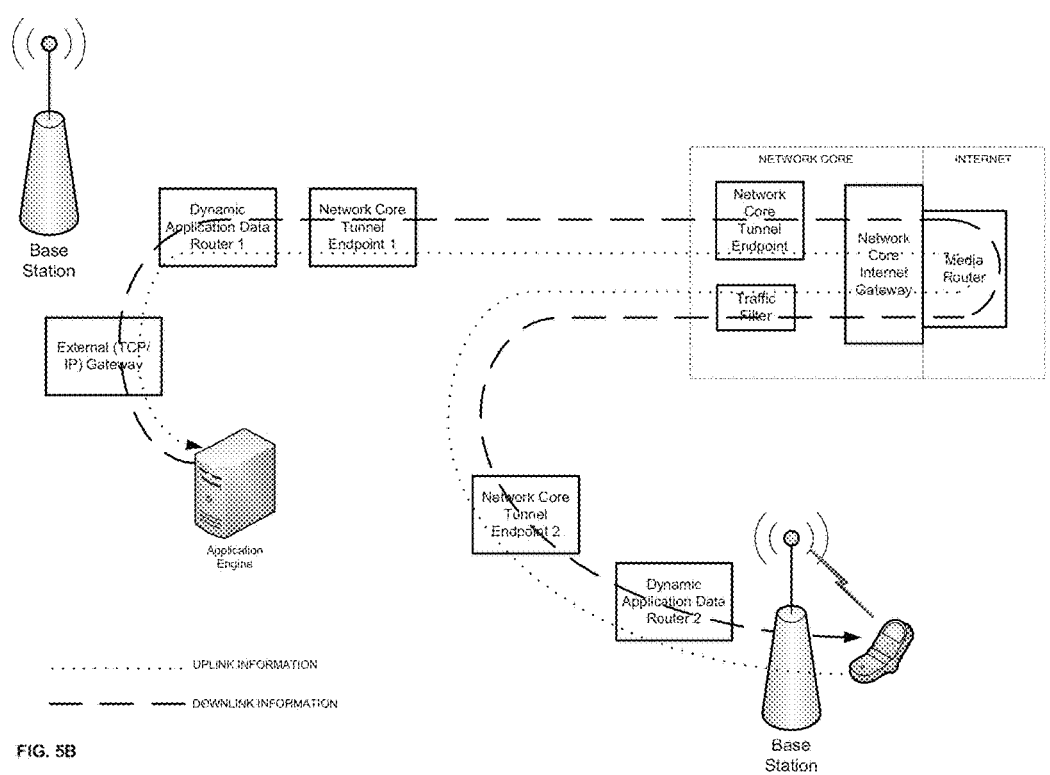
FIG. 5B is a functional block and information flow diagram indicating both upstream and downstream information flow between a mobile application and an application engine, through a mobile communication network according to embodiments, all after a base-station handoff scenario.

FIG. 5B is a functional block and information flow diagram indicating both upstream and downstream information flow between a mobile application and an application engine, through a mobile communication network, according to embodiments, all after a base-station handoff scenario. According to this scenario, the original communication session between mobile device application and an application server/engine is maintained through the same DADR associated TCP/IP network gateway, even after a handoff of the mobile device from a first base-station to a second base-station. According to this scenario, the traffic filter does not block any of the data passing through the network tunnel and communication, between a mobile device application communicatively coupled to the second base-station and an application server/engine communicating through the TCP/IP network gateway associated with the first base-station, is bridged through the network core and/or through the media router functionally associated with the network core.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A Dynamic Application Data Router (DADR) functionally associated with a wireless access point of a mobile communication network, said DADR comprising:
   one or more wireless access point interface circuits adapted to interface with circuits of the wireless access point and to facilitate data communication between said DADR and a mobile device communicatively coupled to the wireless access point;
   an application data routing module comprising signal routing circuitry communicatively coupled to said interface circuits and a DADR associated gateway, said data routing module being adapted to:
   (i) route upstream application data, generated by an application running on the mobile device, to a target application engine associated with the application, through the DADR associated gateway;
   (ii) copy at least a portion of the upstream application data routed through the DADR associated gateway; and
   (iii) send the copied portion of the upstream application data to a billing or lawful interception component within the core of the mobile communication network and
   a zone specific Domain Name System (DNS) Server functionally associated with said application data routing module and including a listing of network addresses correlated to target application engines accessible through said DADR associated gateway, said zone specific DNS Server being adapted to signal said DADR when a given DNS query, received from a given wireless device through said access points, matches a network address in said listing of network addresses and forward to said DADR an indication of a given target application engine correlated within the listing to the matched network address.

2. The DADR according to claim 1, wherein said application data routing module is further adapted to route the copied portion of the upstream application data through a mobile network core tunnel.

3. The DADR according to claim 1, wherein said DADR associated gateway is adapted to forward the upstream application data to the target Application Engine.

4. The DADR according to claim 3, wherein said DADR associated gateway is further adapted to receive downstream application data from the target application engine.

5. The DADR according to claim 4, wherein said application data routing module is further adapted to route downstream application data generated by the target application engine and received by said DADR associated gateway to the mobile device through said one or more wireless access point interface circuits.

6. The DADR according to claim 5, wherein said application data routing module is further adapted to:
 (i) copy at least a portion of the downstream application data received through the DADR associated gateway; and
 (ii) send the copied portion of the downstream application data to the network core of the mobile communications network, through a mobile network core tunnel, gateway or endpoint.

7. The DADR according to claim 1, wherein said application data routing module is also functionally associated with a second wireless access point of the mobile communication network and is further adapted to route upstream application data received through the second wireless access point to a second target application engine through the DADR associated gateway.

8. The DADR according to claim 1, further comprising a controller adapted to coordinate activity between two or more DADR constituent modules or circuits, and further adapted to communicate with a traffic filter functionally associated with the mobile communication network.

9. A mobile communication network comprising:
 a network core;
 one or more wireless access points, each communicatively coupled to said network core and adapted to wirelessly communicate with one or more mobile devices;
 a zone specific Domain Name System (DNS) Server functionally associated with said wireless access points and including a listing of network addresses correlated to target application engines;
 a dynamic application data router (DADR) functionally associated with at least one of said wireless access points, said DADR comprising:
  one or more wireless access point interface circuits adapted to interface with circuits of at least one of said wireless access points and to facilitate data communication between said DADR and a mobile device communicating with the at least one of said wireless access points; and
  an application data routing module comprising signal routing circuitry communicatively coupled to said interface circuits and a DADR associated gateway, said data routing module being adapted to:
   route upstream application data, generated by an application running on the mobile device, to a target application engine associated with the application, through a DADR associated gateway;
 wherein said zone specific DNS server is adapted to signal said DADR when a given DNS query received from a given wireless device through said access points, matches a network address in said listing of network addresses and forward to said DADR an indication of a given target application engine correlated to the matched network address in the listing.

10. The mobile communication network according to claim 9, wherein said application data routing module is further adapted to route a copy of the upstream application data to said network core through a mobile network core tunnel, gateway or endpoint.

11. The mobile communication network according to claim 9, wherein said DADR associated gateway is adapted to forward the upstream application data to the target application engine.

12. The mobile communication network according to claim 9, wherein said DADR associated gateway is further adapted to receive downstream application data from the target application engine.

13. The mobile communication network according to claim 12, wherein said application data routing module is further adapted to route downstream application data received from the target application engine though said DADR associated gateway to the mobile device through said one or more wireless access point interface circuits.

14. The mobile communication network according to claim 13, wherein said application data routing module is further adapted to route a copy of the downstream application data to a network core through a mobile network core tunnel, gateway or endpoint.

15. The mobile communication network according to claim 9, wherein said DADR is adapted to route the upstream application data to the target application engine through an encapsulated data tunnel.

16. The mobile communication network according to claim 15, wherein said DADR is adapted to receive downstream application data from the target application engine through the encapsulated data tunnel.

17. The mobile communication network according to claim 16, wherein said application data routing module is functionally associated with at least two of said wireless access points and is adapted to route upstream application data received through at least two of said wireless access points to target application engines through the DADR associated gateway.

18. The mobile communication network according to claim 9, further comprising a traffic filter between said network core and said DADR.

* * * * *